United States Patent
Hahn

(10) Patent No.: US 12,420,675 B2
(45) Date of Patent: Sep. 23, 2025

(54) METHOD FOR ASCERTAINING A VEHICLE FUEL CELL SYSTEM OPERATING STRATEGY WHICH IS OPTIMIZED WITH RESPECT TO EFFICIENCY AND SERVICE LIFE

(71) Applicant: Robert Bosch GmbH, Stuttgart (DE)

(72) Inventor: Sergei Hahn, Wendlingen Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 18/044,540

(22) PCT Filed: Sep. 8, 2021

(86) PCT No.: PCT/EP2021/074672
§ 371 (c)(1),
(2) Date: Mar. 8, 2023

(87) PCT Pub. No.: WO2022/058210
PCT Pub. Date: Mar. 24, 2022

(65) Prior Publication Data
US 2023/0331121 A1 Oct. 19, 2023

(30) Foreign Application Priority Data
Sep. 16, 2020 (DE) ................ 10 2020 211 584.2

(51) Int. Cl.
*B60L 58/30* (2019.01)
*B60L 50/70* (2019.01)
*H01M 8/04992* (2016.01)

(52) U.S. Cl.
CPC ............. *B60L 58/30* (2019.02); *B60L 50/70* (2019.02); *H01M 8/04992* (2013.01); *H01M 2250/20* (2013.01)

(58) Field of Classification Search
CPC .... B60L 58/30; B60L 50/70; H01M 8/04992; H01M 2250/20
See application file for complete search history.

(56) References Cited

FOREIGN PATENT DOCUMENTS

| CN | 107679268 A | 2/2018 | |
| DE | 10216691 A1 * | 11/2003 | ........ H01M 8/04223 |

(Continued)

OTHER PUBLICATIONS

English Machine Translation of DE-102018216232-A1 (Year: 2018).*

(Continued)

*Primary Examiner* — Andrew J Cromer
(74) *Attorney, Agent, or Firm* — Michael Best & Friedrich LLP

(57) ABSTRACT

The invention relates to a method for ascertaining a vehicle (1) fuel cell system (2) operating strategy which is optimized with respect to efficiency and service life. The method has the steps of:
(a) providing a load profile of the fuel cell system (2),
(b) dividing the provided load profile into at least two load profile ranges with different load ranges, wherein a proportion of the fuel cell system hydrogen consumption and a proportion of the fuel cell system degradation of the entire load profile is determined for each of the at least two load profile ranges,
(c) determining a weighting function for optimizing the efficiency or service life of the fuel cell system in each of the at least two load profile ranges using the proportion of hydrogen consumption and degradation determined for each of the at least two load profile ranges,
(d) determining a parameter set for converting the weighting function in each of the at least two load profile ranges, and (Continued)

(e) ascertaining the operating strategy which is optimized with respect to efficiency and service life according to the determined parameter sets.

10 Claims, 3 Drawing Sheets

(56) References Cited

FOREIGN PATENT DOCUMENTS

| | | |
|---|---|---|
| DE | 102010008917 A1 | 8/2011 |
| DE | 102013020436 A1 | 6/2015 |
| DE | 102018216232 A1 * | 3/2020 ............. B60L 50/70 |

OTHER PUBLICATIONS

English Machine Translation of DE-10216691-A1 (Year: 2003).*
Translation of International Search Report for Application No. PCT/EP2021/074672 dated Jan. 4, 2022 (2 pages).

* cited by examiner

METHOD FOR ASCERTAINING A VEHICLE FUEL CELL SYSTEM OPERATING STRATEGY WHICH IS OPTIMIZED WITH RESPECT TO EFFICIENCY AND SERVICE LIFE

BACKGROUND OF THE INVENTION

In vehicles with a fuel cell system (FCS) as a drive system, which are referred to as fuel cell vehicles (FCV), the oxidizing agent oxygen, taken from the ambient air, is generally used in order to react in the fuel cell with hydrogen to form water or water vapor and thus to supply electrical power by electrochemical conversion. In this case, the efficiency and the service life of a fuel cell system are dependent not only on the relevant load profile, but also on the respective operating parameters, such as temperature and cell voltage.

In this case, a specific power of the fuel cell system can be provided on the basis of a different combination of operating parameters of the fuel cell system. However, the choice of optimal operating parameters depends on the respective boundary conditions (environmental conditions, thermal limitation, water management) and on the application case.

An increase in temperature tends to improve the reaction kinetics and the membrane resistance (at constant humidity conditions). In addition, a further increase in the pressure level is possible, so that a further increase in the power density becomes possible. Furthermore, a possible cooling limitation due to a vehicle radiator can be eased.

However, it must be taken into account here that an increased voltage and an increased temperature tend to lead to an increase in the degradation rate. A variation of the operating parameters consequently leads to a conflict of objectives between hydrogen consumption or efficiency and degradation or service life of the fuel cell system.

In the known operating strategies, the efficiency and the service life of the fuel cell system are generally influenced by the selection of the power demand (power distribution between the battery and the fuel cell system).

SUMMARY OF THE INVENTION

The invention relates to a method for ascertaining an operating strategy of a fuel cell system of a vehicle, said operating strategy being optimized with regard to efficiency and service life, according to the invention, to a computer program product according to the invention, to a control device according to the invention, and to a vehicle according to the invention. Further advantages and details of the invention will become apparent from the dependent claims, the description and the drawings. Here, features and details which are described in connection with the method according to the invention also apply, of course, in connection with the computer program product according to the invention, the control system according to the invention and the vehicle according to the invention and in each case vice versa, so that with regard to the disclosure of individual aspects of the invention, reference is always made reciprocally or can be so made.

According to a first aspect, the invention accordingly relates to a method for ascertaining an operating strategy of a fuel cell system of a vehicle, said operating strategy being optimized with regard to efficiency and service life, the method comprising the steps of:

(a) providing a load profile of the fuel cell system,
(b) dividing the provided load profile into at least two load profile ranges with different load ranges, wherein a proportion of hydrogen consumption and a proportion of degradation of the fuel cell system in the entire load profile are determined for each of the at least two load profile ranges,
(c) determining a weighting function for optimizing efficiency or service life of the fuel cell system in each of the at least two load profile ranges on the basis of the absolute proportion of hydrogen consumption and proportion of degradation determined for each of the at least two load profile ranges,
(d) determining a parameter set for converting the weighting function in each of the at least two load profile ranges, and
(e) ascertaining the operating strategy optimized with regard to efficiency and service life according to the parameter sets determined for each of the at least two load profile ranges.

According to the invention, an operating strategy is consequently ascertained which is optimized for individual load profile ranges of the load profile with regard to efficiency or service life and is thus optimized overall for the entire load profile with regard to efficiency and service life. In other words, efficiency is understood to mean consumption efficiency. Efficiency therefore increases as hydrogen consumption decreases. The service life increases as degradation decreases.

The load profile represents the power provided by the fuel cell system over the course of time or driving operation of the vehicle. The load profile provided is divided into at least two individual load profile ranges. The division can also be made into at least three, at least four or more individual load profile ranges. The load profile ranges can be divided into different power ranges from zero to the maximum power of the fuel cell system. In the case of a fuel cell system with 100 kW of maximum power, 10 power ranges, for example, can be formed in 10 kW steps, i.e. from 0 to 10 kW, from 10 kW to 20 kW and so on, which give the corresponding load profile ranges when applied to the load profile. A load profile range thus allows a statement to be made as to how long the fuel cell system has been operated within a specific power range over the entire time course or driving operation of the vehicle according to the load profile.

For each load profile range, the proportions of hydrogen consumption and proportions of degradation of the fuel cell system are subsequently determined in relation to the entire load profile. In other words, for each load profile range, the proportions of total hydrogen consumption incurred for the load profile and of total degradation occurring in the load profile—or in other words aging—of the fuel cell system are determined. For this purpose, in particular the relative proportion of consumption and the relative proportion of degradation of each load profile range in the entire load profile can be determined.

The proportion of hydrogen consumption can then be compared with the proportion of degradation for each load profile range. This comparison permits determination of the weighting function, i.e. the mathematical expression of whether the efficiency or the service life of the fuel cell system in the relevant load profile range is to be weighted more strongly and accordingly optimized. This can be determined in a particularly simple manner by a comparison of the relative proportion of degradation and the relative proportion of hydrogen consumption for each load profile range. For the respectively higher relative proportion of degradation or hydrogen consumption, the service life or efficiency for the respective load profile range can then be optimized accordingly, since with a higher relative proportion there is more potential for optimization. However, a statistical method or a method based on artificial intelligence can also be used to determine the weighting function.

The proportion of degradation and the proportion of hydrogen consumption for the load profile ranges can be determined, for example, by means of mathematical functions. These mathematical functions can indicate the expected service life and the expected consumption for the load profile range, i.e., for example, depending on the temperature and the voltage of the fuel cell system. Alternatively or additionally, empirical data can be used to determine the proportion of degradation and the proportion of hydrogen consumption.

To implement the weighting function in the relevant load profile range, a parameter set of operating parameters of the fuel cell system is finally determined, by means of which the weighting function can be implemented during operation of the fuel cell system—in other words, the service life or efficiency can be optimized. The parameter sets can be determined, for example, on the basis of stored characteristic maps. However, it is alternatively or additionally possible for the parameter sets to be determined by at least one mathematical function. Finally, these specific parameter sets are selected for each load profile range in order to define an operating strategy over the entire load profile, whereby not only the efficiency but also the service life of the fuel cell system are optimized.

Compared to the solution according to the invention, the desired parameters or operating parameters of the fuel cell system for a power request, such as the temperature and the stoichiometry, are not varied in the known operating methods of fuel cell systems in vehicles. According to the invention, it has been recognized on the other hand that individual application cases and driving styles do however benefit from an individual operating strategy in order to increase the service life and the efficiency of the fuel cell system.

It can be provided for the load profile of the fuel cell system to be recorded during trips with the vehicle. The load profile of the vehicle can accordingly be created by a statistical analysis of the trips. The load profile of the vehicle can thus be determined very precisely and easily processed.

Furthermore, it can be provided for the operating strategy to be adapted in the event of a change in the load profile of the fuel cell system. If, for example, the load profile changes due to other conditions after a changeover or a change of owner, for example from driving predominantly on the freeway to driving predominantly in the city, the operating strategy can be optimized anew with regard to the efficiency and service life of the fuel cell system. For this purpose, it can be provided that the load profile be continuously provided or recorded and the load profile ranges checked for a change in the proportion of hydrogen consumption and proportion of degradation. With sufficient change, a new weighting function can be determined, a new parameter set determined and a new operating strategy according to the new parameter set ascertained.

It can also be provided that the parameter set has a temperature, a pressure and/or a stoichiometry as an operating parameter of the fuel cell system. It has become apparent that the optimization of efficiency or service life in a load profile range can be implemented in the simplest way by changing these operating parameters.

Furthermore, it can be provided that the load profile be subdivided into at least a low-load range, a medium-load range and a high-load range.

Furthermore, it can be provided that the weighting function be selected such that the efficiency and the service life are weighted relative to one another in each of the at least two load profile ranges. To put it clearly, the weighting function can, for example, weight only the efficiency or the service life with a value of 1, the efficiency and the service life with the same value for the two of 0.5, or the efficiency with a value not equal to zero, and the service life with a value not equal to zero, wherein the sum of both values is again 1.

Finally, it can be provided that a Pareto-optimal parameter set be determined for each of the at least two load profile ranges. In the relevant load profile range, either the service life or the consumption can be loaded predominantly disproportionately.

According to a second aspect, the invention relates to a computer program product which can be executed in a control device in a vehicle with a fuel cell system and is configured to carry out the method according to the first aspect of the invention.

According to a third aspect, the invention further relates to a control device for a vehicle with a fuel cell system, wherein the control unit is configured to carry out the method according to the first aspect of the invention.

Finally, according to a fourth aspect, the invention relates to a vehicle with a fuel cell system and to the control device according to the third aspect of the invention.

BRIEF DESCRIPTION OF THE DRAWINGS

The invention is explained in more detail below with reference to the accompanying drawings. All of the features set forth in the claims, the description or the figure can be essential to the invention both per se and in any desired different combinations.

In the drawings.

DETAILED DESCRIPTION

Elements having the same function and mode of operation are each provided with the same reference symbols in FIGS. 1 to 4.

Figure 1:
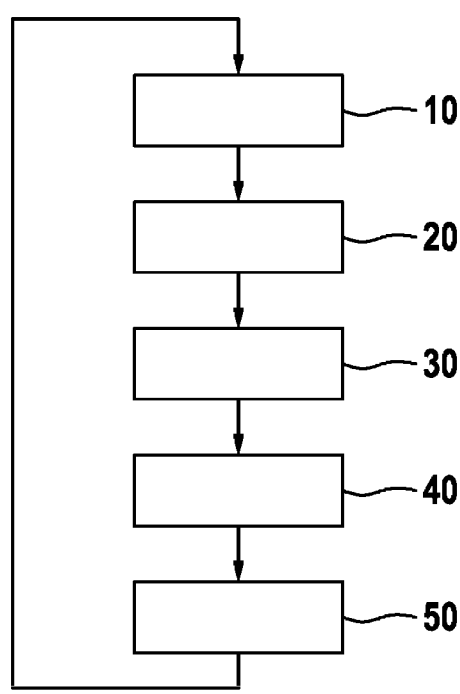
FIG. 1 is a schematic view of the sequence of an exemplary embodiment of a method according to the invention.

FIG. 1 shows a sequence of the method steps of an exemplary embodiment of a method according to the invention for determining an operating strategy of a fuel cell system 2 of a vehicle 1, said operating strategy being optimized with regard to efficiency and service life, according to an exemplary embodiment of the invention.

Figure 2:
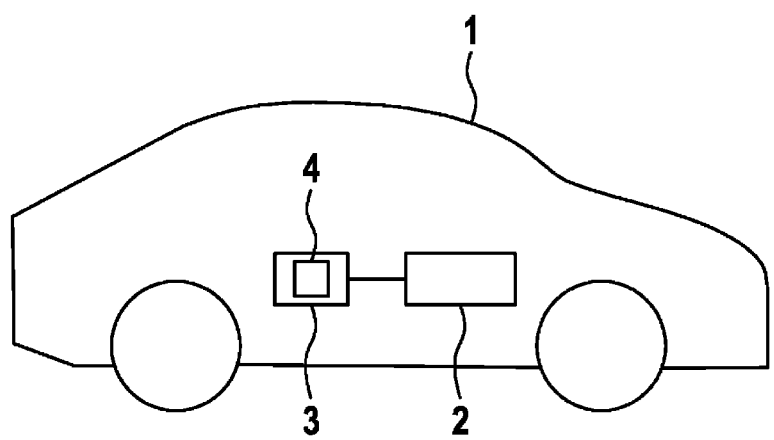
FIG. 2 is a schematic view of a vehicle according to an exemplary embodiment of the invention.

The vehicle 1 is shown schematically in FIG. 2. The vehicle 1 has a fuel cell system 2 as its drive. The operation or the operating strategy of the fuel cell system 2 is specified by a control device 3 in which a computer program product 4 is stored. When the computer program product 4 is executed by the control device 3, the method shown schematically in its sequence in FIG. 1 is carried out.

In a first step 10 of the method from FIG. 1, a load profile of the vehicle 1 is first determined and made available at the control device 3. The determination of the load profile takes place during trips with the vehicle 1 and is in this respect specific to driving behavior, the driving environment, and so on of the driver or of the drivers of the vehicle 1, and the fuel cell system 2 of the vehicle 1.

Figure 3:
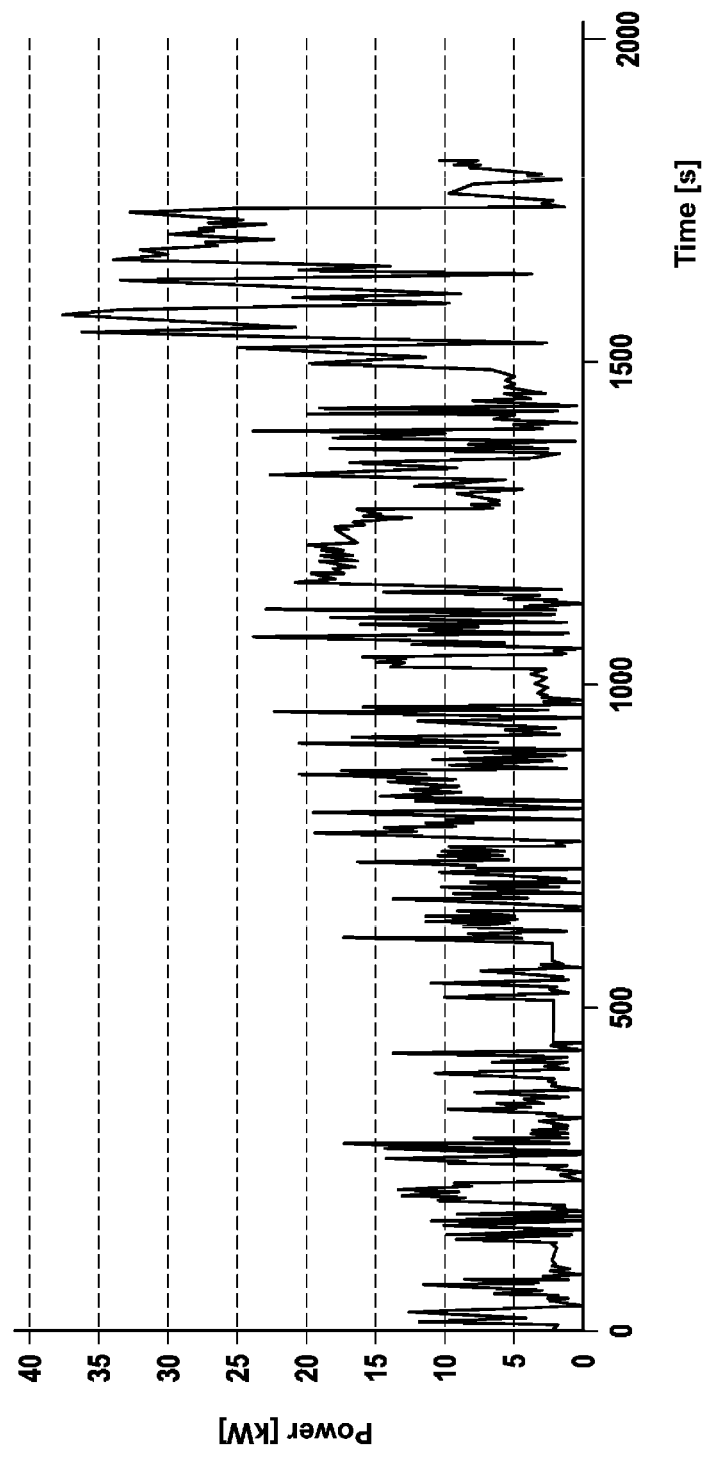
FIG. 3 is a schematic view of a recorded load profile of an exemplary embodiment of a vehicle according to the invention.

Such an exemplary load profile of the vehicle 1 is shown in FIG. 3. The load profile maps the power provided by the fuel cell system 2 or called up by the vehicle 1 in kW over the time in seconds. As can be seen from the load profile, the load profile has times with a higher power requirement and times with a lower power requirement.

The load profile can accordingly be divided into several load profile ranges with different load ranges or power ranges. This is done in a second step 20 of the method from FIG. 1. In addition, a proportion of hydrogen consumption (referred to below as proportion of consumption) and a proportion of degradation of the fuel cell system 2 in the entire load profile are determined for each load profile range. Furthermore, the time proportion of each load profile range is determined. Accordingly, the data shown by way of example in the table below are determined for the load profile from FIG. 2.

|  | Time proportion | Proportion of degradation | Proportion of consumption |
| --- | --- | --- | --- |
| SL | 74.24% | 89.34% | 38.95% |
| ML | 19.99% | 8.98% | 40.36% |
| HL | 5.77% | 1.68% | 20.69% |

As can be seen from the table, the load profile from FIG. 2 has been divided into three load profile ranges with different load ranges. In the present case, these load profile ranges are divided into low load (SL), medium load (ML) and high load (HL). For each of the load profile ranges, the time proportion of the entire load profile and the relative proportion of degradation and the relative proportion of consumption have been determined. The proportion of degradation and the proportion of consumption can have been determined based on empirical data and/or mathematical functions for the relevant load profile range.

In the third step 30, following the second step 20, of the method according to FIG. 1, a weighting function for optimizing efficiency or service life of the fuel cell system 2 in each of the three load profile ranges SL, ML and HL is finally determined on the basis of the proportion of consumption and the proportion of degradation determined for each of the three load profile ranges SL, ML, HL.

It can thus be seen, for example, on the basis of the load profile range SL that this accounts for 74.24% which is by far the largest time component in the load profile of the fuel cell system 2. The relative proportion of degradation is very high at 89.34%, while the relative consumption proportion at 38.95% is comparatively low, in particular with regard to the high time component of the load profile range SL in the entire load profile. Accordingly, the weighting function for the load profile range SL is determined in such a way that the degradation is reduced or the service life increased. As a result of the conflict of objectives between efficiency and service life, the consumption is increased in response. However, since the relative proportion of the degradation is significantly higher than that of consumption, it nevertheless makes sense in the load profile range SL to increase service life to the disadvantage of consumption.

In contrast, the situation is different in the load profile ranges ML and HL where the relative consumption proportions significantly outweigh the proportions of degradation. In this respect, the weighting functions for the load profile ranges ML and HL are determined in such a way that consumption is reduced or efficiency is increased, while degradation increases in response.

Finally, in a fourth step 40 of the method according to FIG. 1, a Pareto-optimal parameter set is determined for implementing the weighting function in each of the three load profile ranges SL, ML and HL.

Figure 4:
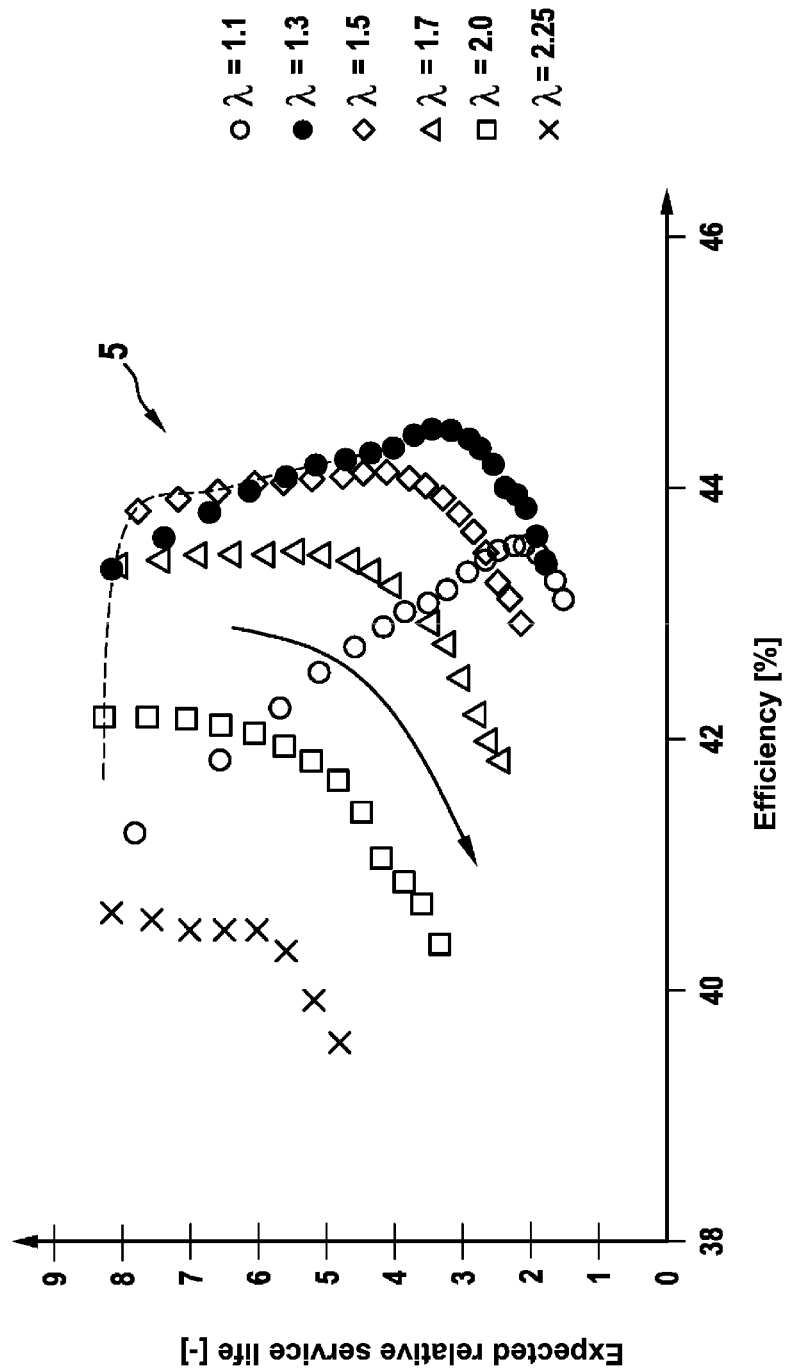
FIG. 4 is a schematic view of a profile of the expected service life plotted against an efficiency of the fuel cell system.

FIG. 4 shows a schematic view of a curve of the expected service life plotted against an efficiency of the fuel cell system 2 for different stoichiometric coefficients X at an operating point of 400 A. The stoichiometric coefficient X indicates how much oxygen is supplied to the cathodes of the fuel cells of the fuel cell system 2. A stoichiometric coefficient of 1 means that 100% of the supplied oxygen is converted in the electrochemical reaction in the fuel cell. Pareto-optimal stoichiometric coefficients X lie on the curve 5, which represents a front of Pareto-optimal points. The stoichiometric coefficient X for a given operating point for the parameter set of a load profile range can be selected on this curve 5, for example. Accordingly, other operating parameters for each load profile range are also selected.

In a fifth step 50, the operating strategy is finally defined in accordance with the determined parameter sets for the operation of the vehicle 1 or of the fuel cell system 2 in order to optimize the efficiency and service life of the fuel cell system 2. The fuel cell system 2 of the vehicle 1 is henceforth operated correspondingly with this operating strategy. Should the load profile change, the method will be repeated in order to re-determine the weighting function and the parameter sets and thus redefine the operating strategy. This is symbolized by the arrow connecting method step 50 to method step 10.

The invention claimed is:

1. A method for determining an operating strategy of a fuel cell system (2) of a vehicle (1), said operating strategy being optimized with regard to efficiency and service life, wherein the method comprises the steps of:
   providing a load profile of the fuel cell system (2),
   dividing the provided load profile into load profile ranges with different power ranges,
   for each load profile range,
      determining, for the load profile range, a proportion of hydrogen consumption and a proportion of degradation of the fuel cell system in relation to a total hydrogen consumption and a total proportion of degradation occurring in the provided load profile,
   determining a weighting function for optimizing efficiency or service life of the fuel cell system in each of the load profile ranges based on the proportion of hydrogen consumption and proportion of degradation determined for each of the load profile ranges,
   for each load profile range,
      determining a parameter set for implementing the weighting function in the load profile range,
   determining the operating strategy optimized with regard to efficiency and service life according to the parameter sets determined for each of the load profile ranges, and
   operating the fuel cell system of the vehicle based on the operating strategy.

2. The method according to claim 1, wherein the load profile of the fuel cell system (2) is recorded during trips with the vehicle (1).

3. The method according to claim 1, wherein the operating strategy is adapted in response to a change in the load profile of the fuel cell system (2).

4. The method according to claim 1, wherein the parameter set has a temperature, a pressure and/or a stoichiometry as an operating parameter of the fuel cell system (2).

5. The method according to claim 1, wherein the load profile is divided into at least a low-load range, a medium-load range, and a high-load range.

6. The method according to claim 1, wherein the weighting function is selected such that the efficiency and the service life are weighted relative to one another in each of the load profile ranges.

7. The method according to claim 1, wherein a Pareto-optimal parameter set is determined for each of the load profile ranges.

8. A non-transitory, computer-readable media containing instructions that when executed by a computer cause the computer to control a fuel cell system (2) by
providing a load profile of the fuel cell system (2),
dividing the provided load profile into load profile ranges with different power ranges,
for each load profile range,
determining, for the load profile range, a proportion of hydrogen consumption and a proportion of degradation of the fuel cell system in relation to a total hydrogen consumption and a total proportion of degradation occurring in the provided load profile,
determining a weighting function for optimizing efficiency or service life of the fuel cell system in each of the load profile ranges based on the proportion of hydrogen consumption and proportion of degradation determined for each of the load profile ranges,
for each load profile range,
determining a parameter set for implementing the weighting function in the load profile range,
determining an operating strategy optimized with regard to efficiency and service life according to the parameter sets determined for each of the load profile ranges, and
operating the fuel cell system of a vehicle based on the operating strategy.

9. A control device (3) for a vehicle (1) with a fuel cell system (2), wherein the control device (3) is configured to control the fuel cell system (2) by
providing a load profile of the fuel cell system (2),
dividing the provided load profile into load profile ranges with different power ranges,
for each load profile range,
determining, for the load profile range, a proportion of hydrogen consumption and a proportion of degradation of the fuel cell system in relation to a total hydrogen consumption and a total proportion of degradation occurring in the provided load profile,
determining a weighting function for optimizing efficiency or service life of the fuel cell system in each of the load profile ranges based on the proportion of hydrogen consumption and proportion of degradation determined for each of the load profile ranges,
for each load profile range,
determining a parameter set for implementing the weighting function in the load profile range,
determining an operating strategy optimized with regard to efficiency and service life according to the parameter sets determined for each of the load profile ranges, and
operating the fuel cell system of the vehicle based on the operating strategy.

10. A vehicle (1) having a fuel cell system (2) and the control device (3) according to claim 9.

* * * * *